Figure 1:
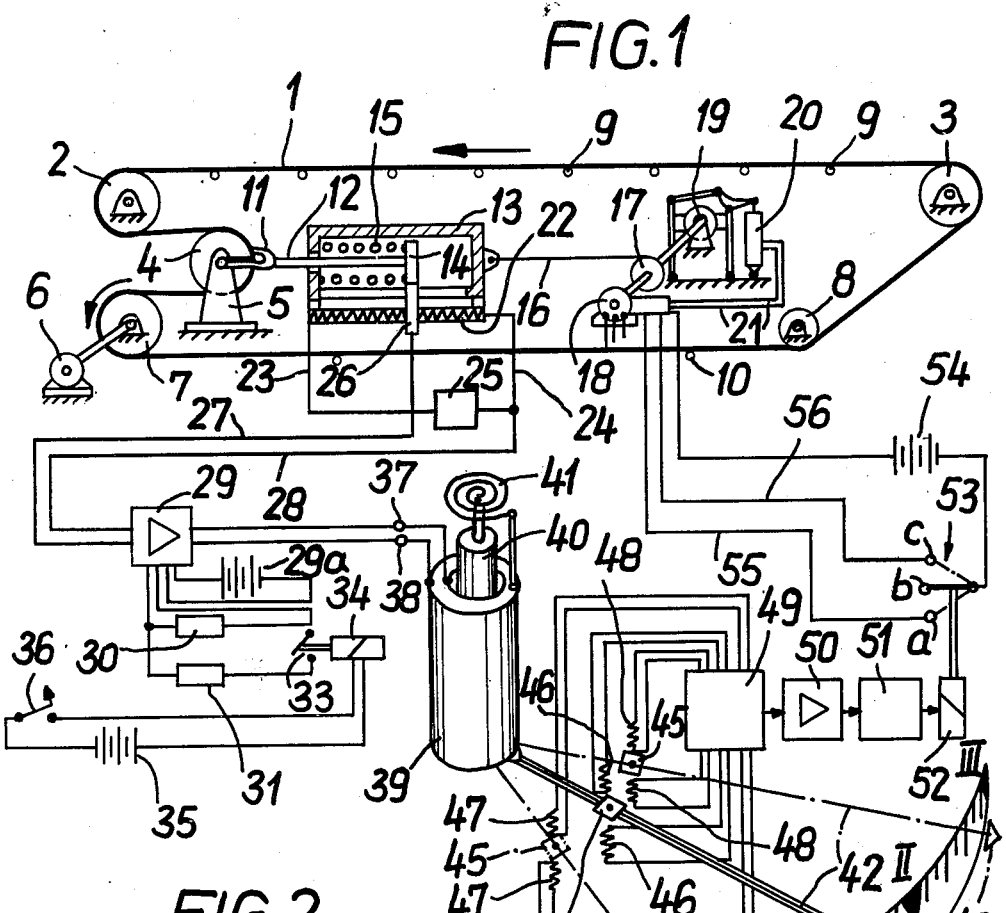

United States Patent [19]
Jungel

[11] 3,909,692
[45] Sept. 30, 1975

[54] MEASURING INSTRUMENT CONTROL

[75] Inventor: Heinrich Jungel, Rheinhausen, Germany

[73] Assignee: Fried. Krupp Gesellschaft mit beschrankter Haftung, Essen, Germany

[22] Filed: Feb. 4, 1974

[21] Appl. No.: 439,619

[30] Foreign Application Priority Data
Feb. 7, 1973 Germany.............................. 2305849

[52] U.S. Cl...................... 318/490; 318/6; 324/157
[51] Int. Cl.²............................................ G05B 1/08
[58] Field of Search..................... 318/6, 7, 39, 490; 324/157; 340/266; 346/17, 25

[56] References Cited
UNITED STATES PATENTS

| | | | |
|---|---|---|---|
| 2,536,806 | 1/1951 | Hansen, Jr. ....................... | 324/157 x |
| 2,861,140 | 11/1958 | Woodall et al. .................. | 346/25 X |
| 3,045,222 | 7/1962 | Spergel ........................... | 318/490 X |
| 3,139,217 | 6/1964 | Mell.................................. | 318/39 X |
| 3,421,059 | 1/1969 | Takahashi........................ | 318/490 X |

*Primary Examiner*—Robert K. Schaefer
*Assistant Examiner*—W. E. Duncanson, Jr
*Attorney, Agent, or Firm*—Walter Becker

[57] ABSTRACT

A measuring instrument control which includes: control means associated with said measuring ranges for shifting over from one measuring range to another and vice versa, while means are provided for receiving input signals corresponding to the actual values measured of the respective measurements, to be effected, electric means being operable to so convert said input values that the position of pointer means in cooperation with scales have associated therewith actual values higher or lower by one step.

3 Claims, 3 Drawing Figures

U.S. Patent  Sept. 30,1975  3,909,692

MEASURING INSTRUMENT CONTROL

For control purposed frequently so-called measuring instrument controls are employed. In such an instance usually a measuring instrument is involved such as a galvanometer with for instance inductive feeler heads. Such feeler heads may be arranged in those portions of the scale or dial which correspond to certain rated values. When the pointer of the instrument moves to these places, the feeler heads furnish control pulses to an adjusting element, for instance a relay. For structural reasons, generally only a limited number of feeler heads for instance three or four, can be arranged over the dial within the region of the pointer deflections involved.

This defect can be remedied by employing a time relay to save a feeler head which would correspond to the medium rated value of control range. In such an instance, only the upper and the lower limit value of each control range would be covered by feeler heads which then, when they are caused by the pointer to release control pulses, actuate a time relay which furnishes the initiated control operation when the actual value has reached the medium rated value between the two limit values. Such arrangement, however, would be expensive and from a control technical point be unsatisfactory because two different control influences are employed, namely the pointer position and the time. Moreover, in most instances the requirement for the usefulness of such step is not met namely that during the control operation, the actual values vary exclusively in conformity with time.

Therefore, it is an object of the present invention to provide a measuring instrument control in such a way that two or more control ranges will be covered with a minimum of parts and expenses. This object and other objects and advantages of the invention will appear more clearly from the following specification in connection with the accompanying drawing, in which:

FIG. 1 diagrammatically illustrates a conveyor installation with a measuring instrument control as an embodiment of the present invention.

Figure 2:
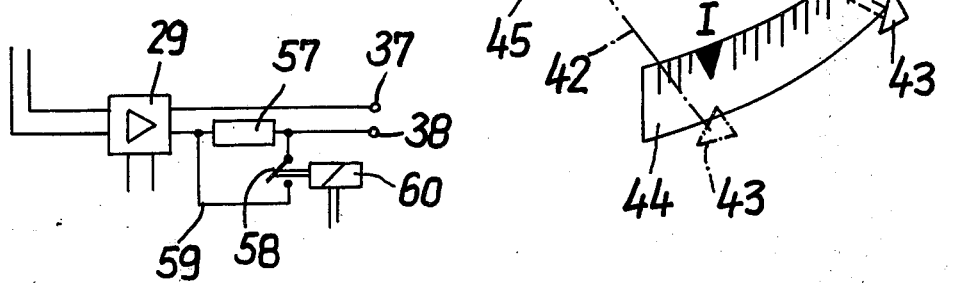
Figure 3:
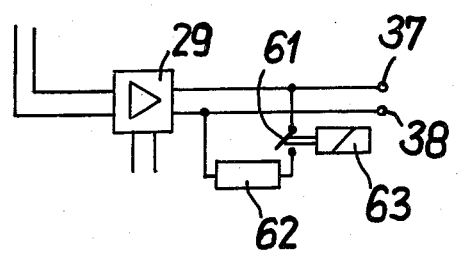

FIGS. 2 and 3 respectively illustrate modifications of the measuring instrument control according to the present invention.

The measuring instrument according to the present invention is characterized primarily in that for purposes of covering two or more control ranges with a limited number of feeler heads, there is provided a control device for realizing different steps of conversion from rated values to pointer deflections.

More specifically, the object of the present invention is realized by a measuring range shift-over as it is known in connection with measuring instruments comprising indicating means. In particular, the input signals corresponding to the actual values are, depending on the respective condition of operation by the electrical control elements pertaining to the instrument control converted in such a way that the pointer positions have respectively associated therewith actual values which are higher or lower by one step. In conformity with the respective steps, the measuring instrument control may also be provided with two or more scales or dials for the various steps. Furthermore, control lights may be provided for indicating which of the scales or dials are effective at the respective time.

The invention brings about in a simple manner that with the few feeler heads which can be arranged within the body of the measuring instrument, a desired number of different control ranges for different conditions of operation can be realized without requiring the above mentioned time relay.

Thus, for instance, a measuring instrument control according to the invention may with a long conveyor belt installation be used for automatically controlling the tension of the belt. It may be assumed that the pulling force acting in the belt will at a certain place of the conveying path, for instance shortly ahead of a driving station, at the start of the conveyor belt installation, amount to 16.5 Mp and must not drop to less than 15.0 Mp, whereas at normal conveyor operation the pulling force in the belt should amount to 5.5 Mp, must not drop to less than 5.0 Mp and must not exceed 6.0 Mp. If for such a control a heretofore customary measuring instrument control is to be employed, such control would have to have six feeler heads. In such an instance, the actual values of the respective pulling force in the belt which force is measured in known manner for instance by means of a conveyor-type weigher are transformed into electrical input signals for the measuring instrument control and during the starting of the conveyor belt installation, only the feeler heads for the rated values of 15.0, 16.5, and 18.0 Mp are switched on. In contrast thereto, during normal conveying operation, only the feeler heads for the rated values of 5.0, 5.5, and 6.0 Mp are switched on. If for instance during the starting, the pulling force in the belt exceeds 16.5 Mp and reaches 18.0 Mp, so that the pointer moves above the respective feeler head, the latter releases a pulse which acts upon the adjusting motor for the tension drum of the installation in such a way that the pulling force in the belt decreases. When this pulling force has dropped to 16.5 Mp, and when the pointer moves above the pertaining feeler head, the latter releases a pulse to the adjusting motor in such a way that the belt tension will not be reduced any further. Correspondingly, when the pulling force in the belt drops to 15.0 Mp, the pertaining feeler head responds which then releases a pulse for increasing the belt tension. In this way, the pulling force of the belt is kept to the value 16.5 Mp with tolerances of ± 0.5 Mp. However, in many instances due to lack of space, it is not possible to provide six feeler heads over the scale of the measuring instrument control at the respective places.

Therefore, it has been suggested to employ only four feeler heads for the two pairs of limit values of the two control ranges, namely starting and normal operation, which means for 15.0 and 18.0 Mp and for 5.0 and 6.0 Mp, and it has furthermore been suggested in such an instance to employ two time relays. These time relays are each time switched on when the pulling force in the belt reaches the lower or the upper limit value of the respective control range, and they finish the control operation initiated by the respective limit value feeler head after a certain period with which, according to an assumption, the pulling force in the belt has reached the rated value of 16.5 Mp and 5.5 Mp respectively. This, however, would entail the above mentioned drawbacks.

In contrast thereto, according to the present invention, with the assumed example, a total of only three feeler heads is required. Of these feeler heads one is intended for the rated values of 15.0 and 5.0 Mp, a second feeler head is intended for the rated values of 16.5 and 5.5 Mp and the third feeler head for the rated values of 18.0 and 6.0 Mp. In this connection, depending on whether the belt installation is in its starting condition or is in its condition of normal conveying operation, the three feeler heads are by means of a control device set for the upper or the lower rated values. A control according to the invention may be designed structurally in the manner of a galvanometer control or any other suitable electrical instrument.

Referring now to the drawing in detail, the conveyor belt installation comprises an endless conveyor belt 1 which at both ends of the conveyor path turns around a reversing drum 2 and 3 respectively. From the front reversing drum 2, the conveyor belt 1 passes through a loop over a tension drum 4, the shaft of which is journalled in displaceably guided supports 5, and furthermore moves over a driving drum 7 drivingly connected to motor 6. From here the lower section of the conveyor belt 1 moves back over a deviating drum 8 to the rear reversing drum 3. The upper section of the conveyor belt 1 is supported by rollers 9, and the lower section of the belt is supported by rollers 10.

A fork 11 engages the shaft of the tension drum 4. This fork has an extension formed by a bar 12. Bar 12 extends through a bore in an end face of a housing 13 and is in the interior thereof connected to a spring dish 14. Between spring dish 14 and the above mentioned end face wall there is provided a pressure spring 15. That end of the housing 13 which faces away from the tension drum 4 is engaged by a cable 16 which is looped over a winch drum 17. Drum 17 is adapted to be driven by an electric motor 18. Mounted on the extended shaft of the winch drum 17 is a disc 19 of a shoe brake which includes a brake releasing device 20. This device 20 is by conductors 21 connected to the electric motor 18 and automatically brings about that when the motor 18 is turned on, the shoe brake will be relieved, whereas when the electric motor is turned off, a brake spring arranged in the brake relieving device brings about that the brake shoes arrest the disc 19 whereby the winch drum 17 is prevented from rotation.

Mounted on the housing 13 is a potentiometer 22 the two ends of which are connected by conductors 23, 24 to a constant current source 25. Fixed at the spring dish 14 is an electrically conductive sliding tap 26 which pertains to the potentiometer 22. The elements 22 to 26 constitute a measuring value receiver. The sliding tap 26 and the conductor 24 are connected by conductors 27 and 28 respectively to an amplifier 29. For supplying the amplifier 29 with current, a battery 29a is provided. Two resistors 30, 31, arranged in parallel, are connected to the amplifier 29. The resistor 31 may be switched off by means of a disconnector switch 33 which is operated by a relay 34. This may be effected by remote control by means of a circuit with a battery 35 and a switch 36.

The rotatably journalled coil 39 of a moving coil galvanometer known per se is connected to two terminals 37, 38 connected to the amplifier 29. In the interior of the coil there is provided a stationary permanent magnet 40. The coil 39 is provided with a back setting spring 41. On the coil 39 is arranged the pointed 42 of the moving coil galvanometer.

The tip 43 of the pointer plays over a dial 44. This dial has three markings I, II, and III. The marking II shows the rated value of the belt tension, which rated value according to the above mentioned example will at the starting of the conveyor belt installation amount to 16.5 Mp, and at normal conveyor operation will amount to 5.5 Mp. The marking I indicates the lowermost admissible value of the belt tension, which lowermost admissible value will at the starting of the belt amount to 15.0 Mp and at normal conveyor operation will amount to 5.0 Mp. The marking III indicates the uppermost admissible value of the belt tension which uppermost admissible value amounts to 18.0 Mp during the starting phase of the belt and amounts to 6.0 Mp during normal conveying operation.

A metallic foil 45 is seated on the pointer 42. When the tip 43 of the pointer is located opposite the marking II, the metallic foil 45 is located between two coils 46. When the tip 43 is located opposite the marking I, the foil 45 is located between two coils 47. When the tip 43 is located opposite the marking III, the foil 45 is located between two coils 48. The coils 46, 47, and 48 are by conductors connected to an oscillator 49. Connected to the oscillator 49 is an amplifier 50 to which is connected a switch step 51 which has connected thereto a relay 52. The relay 52 actuates a change-over switch 53 which in two end positions $a$ and $c$ closes a circuit of a battery 54 for controlling electrical motor 18 alternately through conductors 55, 56 in such a way that the motor 18 is turned on with changing direction of rotation. In an intermediate position $b$ of the change-over switch 53, the circuit is interrupted.

It may be assumed that the conveying belt installation is in its starting phase. In this condition, by actuating the switch 36, the disconnector switch 33 is closed by relay 34. Thus the degree of amplification is decreased. If then the tension in the conveyor belt 1 has the rated value of 16.5 Mp, which corresponds to a certain compression of the pressure spring 15 and thereby to a certain position of the sliding tap 26 on the potentiometer 22, a certain voltage is supplied to the amplifier 29. This voltage is amplified by the amplifier 29. In conformity with the voltage accordingly occurring at the terminals 37, 38, and in conformity with the current passing through the coil 39, this coil occupies a certain rotary position. The pointer 42 will in this condition occupy its central position indicated in full lines in which the tip 43 is located opposite the marking II. The foil 45 will then be located between the coils 46. Consequently the relay 52 will keep the change-over switch 53 in its central position $b$. Therefore, the motor 18 is switched off, and the winch drum 17 is arrested by means of the shoe brake with disc 19.

When during the starting phase of the conveyor, the tension in the conveyor belt 1 drops below the rated value, the pressure spring 15 expands, and due to the sliding of the sliding tap 26 over the potentiometer 22, the amplifier 29 receives a smaller voltage from the conductors 27, 28 and correspondingly less current passes through the coil 39. Consequently, coil 39 will by the back setting spring 41 be so turned that the tip 43 approaches the marking I. When the tip 43 is located opposite marking I, this will correspond to a belt tension of 15.0 Mp which means to the maximum deviation downwardly from the rated value. In this connection, foil 45 will be located between the coils 47. As a result thereof, the oscillator 49 is influenced in such a manner that by means of the amplifier 50 an electric tilting-over effect is produced within the switch step 51 when the foil 45 occupies the position in the middle between the coils 47. Consequently, by means of relay 52, the change-over switch 53 is moved into its position $a$.

Therefore, the motor 18 is turned on in such a direction that it will drive the winch drum 17 in the direction of winding up the cable 16 while by means of the brake relieving device 20, the shoe brake is relieved. Consequently, housing 13 is moved toward the right, and pressure spring 15 is compressed. Therefore, the belt tension is increased and thus also the voltage at the terminals 37, 38 and the current passing through coil 39 are increased. As a result thereof, the pointer 42 is turned in such a way that the tip 43 approaches the marking II. When the tip 43 has reached a position opposite the marking II and when the foil 54 has reached a position between the coils 46, relay 52 received a pulse to the effect that it moves the change-over switch 53 into its intermediate position b. Thus motor 18 is turned off and the winch drum 17 is held stationary by the shoe brake. Therefore, the obtained belt tension maintains its rated value of 16.5 Mp.

If during the starting of movement of the conveyor belt 1, the belt tension should increase beyond the rated value, the spring 15 would be compressed further and the pointer 42 would be turned to such an extent that its tip 43 approaches the marking III. When the tip 43 has moved opposite the marking III and the foil 45 has moved between the coils 48, the relay 52 will receive a pulse with the effect that the change-over switch 53 is moved into position c. This occurs when the belt tension has reached the value of 18.0 Mp. Thereupon the motor 18 is switched on in reverse direction as before so that it will turn the winch drum 17 in the direction of the unwinding of cable 16. Consequently, housing 13 moves toward the left, and pressure spring 15 expands so that the voltage at the terminals 37, 38 decreases and less current passes through the coil 39, and the pointer 42 is rotated in the direction to its central position. When the tip 43 then reaches a position opposite the marking II, and the foil 45 occupies the position between the coils 46, then the relay 52 of the change-over switch 53 is moved into position b. Then the rated value of 16.5 Mp is again reached, and the motor 18 is turned off while the winch drum 17 is held in its position by the shoe brake.

When the starting phase is finished, that is to say during the normal conveying operation, the switch 33 is opened by means of switch 36 influencing the relay 34. Consequently, the amplifier 29 has a greater degree of amplification. Then, the rated value of belt tension of 5.5 Mp is coordinated to the middle position of pointer 42 in which the tip 43 is located opposite the marking II. As long as this situation is existant, the change-over switch 53 remains in the position b and the motor 18 is turned off and the winch drum 17 is held stationary by the shoe brake.

When the belt during the ordinary conveyor operation drops below the rated value, and when the belt tension increases above the rated value, the pointer 42 moves correspondingly as has been described above for the starting of the conveyor belt. When the belt tension to the lowermost admissible value of 5.0 Mp, the tip 43 occupies a position opposite the marking I. When the belt tension during normal conveyor belt operation increases up to the maximum admissible value of 6.0 Mp, the tip 43 occupies a position opposite the marking III. Accordingly, the motor 18 will be turned on once in the direction of the winding cable 16 onto the winch drum 17, and another time is turned in the opposite direction for unwinding the cable 16.

The switchover of the measuring instrument control from the condition of the conveyor belt installation during the starting phase of the latter to the condition during normal conveyor operation may according to FIGS. 2 and 3 be effected without influencing the amplifier 29. According to FIG. 2, the voltage at the terminals 37, 38 is changed by making a resistor 57 effective or ineffective, said resistor being located in the connecting line of one of the two terminals. This may be effected by opening or closing a disconnecting switch 58 by means of a relay 60, which switch is located in a conductor 59 bypassing the resistor 57. According to FIG. 3, the control current passing via the terminals 37, 38 to the coil 39 is changed by opening a dissconnection switch 61 by relay 63 or closing said switch 61, said disconnection switch 61 being located in a conductor comprising a resistor 62 and bridging the two connecting lines of the terminals 37, 38.

According to the modifications of FIGS. 2 and 3, it is possible under certain circumstances to omit the amplifiers 29 if the measuring value receiver 22 to 26 itself furnishes a sufficiently strong electrical measuring signal.

With a measuring instrument control of the above mentioned type, any desired physical factors other than the belt tension with a conveyor belt installation may for two or more different conditions of operation be controlled between certain limit values. In each instance it is necessary that only the respectively ascertained value of the respective physical factor is converted into an electrical measuring signal which depending on the respective condition of operation is amplified in a suitable manner or is reduced and acts upon a suitable indicating device with feeler bodies in conformity with coils 46, 47 and 48. The pulses which are respectively emitted from this indicating device over feeler bodies will then, depending on the type of the physical factor to be limited act upon adjusting elements, for instance when limiting the specific pressures of compressors or throttle valves.

It is, of course, to be understood that the present invention is, by no means, limited to the specific showing in the drawing but also comprises any modifications within the scope of the appended claims.

What is claimed is:

1. In a control system for controlling a physical factor; a measuring instrument having a deflectable element which varies in position in conformity with the signals supplied to the instrument, a signal developing element operable to develop signals for said instrument and operatively connected to the factor to be controlled thereby, adjusting means for adjusting said factor and therethrough said signal developing means, means actuated by said deflectable element in deflected positions thereof for actuating said adjusting means, signal processing means having an input connected to receive signals from said signal developing element and an output connected to supply signals to said instrument, and selector means connected to said signal processing means and operable to adjust the signal output thereof relative to the signal input thereto, the factor to be controlled being a conveyor belt and the load adjusting means adjusting the tension in said belt, said load adjusting means including a movable pulley about which the belt is entrained, said signal developing means comprising a resistor element adjustable in conformity with movements of said pulley.

2. A control system according to claim 1 in which said load adjusting means includes a spring operably connected to said pulley, a cable connected to the spring, a winch connected to the cable, a reversable motor for driving said winch in opposite directions, a brake for holding said winch stationary and means for releasing the brake when the motor is energized and for actuating the brake when the motor is deenergized.

3. In a control system for controlling a physical factor; a measuring instrument having a deflectable element which varies in position in conformity with the signals supplied to the instrument, a signal developing element operable to develop signals for said instrument and operatively connected to the factor to be controlled thereby, adjusting means for adjusting said factor and therethrough said signal developing means, means actuated by said deflectable element in deflected positions thereof for actuating said adjusting means, signal processing means having an input connected to receive signals from said signal developing element and an output connected to supply signals to said instrument, and selector means connected to said signal processing means and operable to adjust the signal output thereof relative to the signal input thereto, said signal processing means including an amplifier for amplifying signals and said selector means comprising means connected to the amplifier and adjustable for changing the amplifying ratio thereof.

* * * * *